United States Patent [19]

Seidel et al.

[11] 4,303,451
[45] Dec. 1, 1981

[54] METHOD FOR MODIFYING TEXTURE AND FLAVOR OF WAXY MAIZE STARCH

[75] Inventors: William C. Seidel, Monsey; Howard D. Stahl, Hartsdale; George E. Orozovich, Flushing, all of N.Y.

[73] Assignee: General Foods Corporation, White Plains, N.Y.

[21] Appl. No.: 135,578

[22] Filed: Mar. 31, 1980

[51] Int. Cl.³ .......................... C13L 1/08; A23L 1/187
[52] U.S. Cl. ....................................... 127/32; 127/71; 426/578; 426/579
[58] Field of Search ................... 127/32, 71; 426/578, 426/579

[56] References Cited

U.S. PATENT DOCUMENTS

| | | | |
|---|---|---|---|
| 2,052,308 | 8/1936 | Kerr | 127/71 |
| 2,257,599 | 9/1941 | Frischmuth | 426/579 |
| 2,401,813 | 6/1946 | Bulfer | 127/71 |
| 2,431,512 | 11/1947 | Schopmeyer | 426/579 X |
| 3,527,606 | 9/1970 | Taylor | 127/71 |
| 3,746,690 | 7/1973 | Lolkema | |
| 3,904,429 | 9/1975 | Eastman | 127/71 |
| 3,914,456 | 10/1975 | Norsby | 426/579 |
| 4,025,657 | 5/1977 | Cheng | 426/579 |
| 4,192,900 | 3/1980 | Cheng | 127/32 X |

OTHER PUBLICATIONS

Richard M. Boettger, Cereal Science Today, 8 (4), 106-108 (1963).

*Primary Examiner*—Sidney Marantz
*Attorney, Agent, or Firm*—Joyce P. Hill; Daniel J. Donovan; Thomas R. Savoie

[57] ABSTRACT

The flavor of waxy maize starch intended for use in thickened food compositions are modified by heat treating the starch to a temperature between about 120° and about 200° C. for a time period of less than 1 hour up to about 24 hours. The heat-treated waxy maize is then pregelatinized and remains flavor-free with a suitable texture for incorporation by mixing in thickened food compositions such as instant puddings.

10 Claims, 1 Drawing Figure

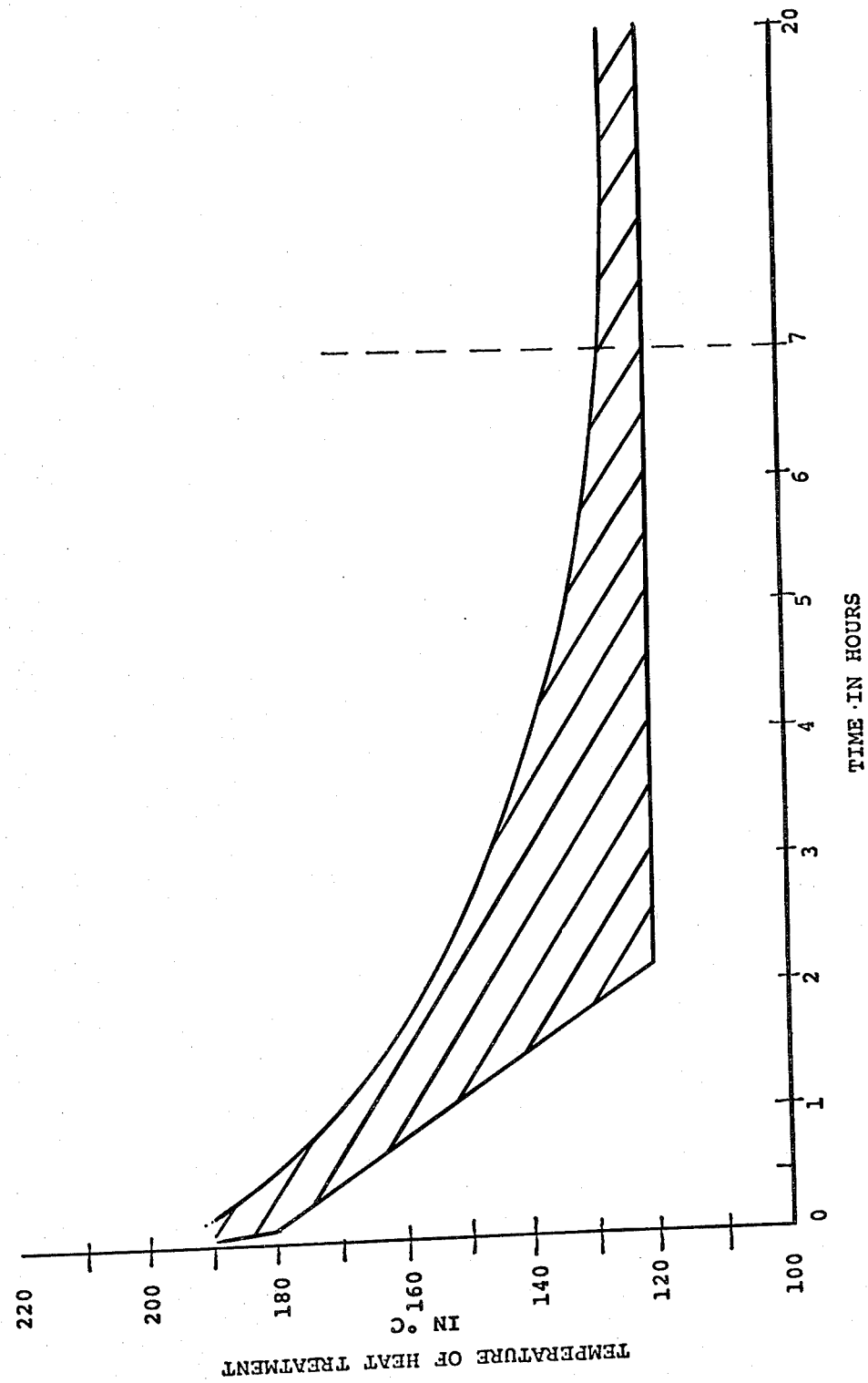

METHOD FOR MODIFYING TEXTURE AND FLAVOR OF WAXY MAIZE STARCH

TECHNICAL FIELD

It is desirable that a pregelatinized starch be bland in flavor and provide a creamy texture when used in sauces, soup mixes, instant pudding compositions and the like. Tapioca starch, because of its bland flavor, has been used almost exclusively as the textural ingredient in the appropriate food compositions. Generally, the tapioca starch is chemically modified to impart the desired textural properties prior to incorporation in the food compositions. The tapioca starch is usually modified by reaction with propylene oxide and phosphorous oxychloride. In addition to the obvious expense attendent to this chemical modification step, side products of the reaction are various chlorohydrins which pose in environmental problem.

In addition to the cost and environmental disadvantages attendent to the separate chemical modification step of tapioca, the use of tapioca starch is also disadvantageous in that the sole source of the most desirable form of tapioca starch is Thailand. A form of tapioca starch is also available in Brazil; however, the Brazilian tapioca starch is inferior to that obtained from Thailand. Due to political upheaval and possible fluctuations in prices in the world trade market, the food industry and public would profit from the use of a more readily-available starch in the formulation of soup mixes, sauces, puddings and other similar compositions.

Certain starches, such as corn and waxy maize, are readily available but not used in thickened food compositions due to woody off-flavors obtained upon pregelatinization and storage. These readily-available starches are capable of providing the desired textural quality to such food compositions, but possess a highly undesirable "woody" or "popsicle stick" off-flavor to which some consumers are very sensitive and dislike.

According to the present invention, a method has been provided for modifying the texture of and removing the undesirable woody off-flavors from waxy maize, a widely available starch, having a high amylopectin content. A waxy maize starch, treated according to the process of this invention, is then pregelatinized, with or without additional processing, and used in the appropriate food compositions. For example, the instant pudding compositions formulated from pregelatinized waxy maize starch of this invention and those formulated from conventional, chemically-modified tapioca starch are indistinguishable to most consumers.

DISCLOSURE OF THE INVENTION

The texture and flavor of waxy maize starch, adaptable for use in formulating sauces, soup mixes, instant pudding compositions and the like, are modified by heating the waxy maize starch to a temperature between 120° C. and about 200° C. for a time sufficient to prevent the formation of woody off-flavors during the subsequent pregelatinization and storage of the starch granules.

It has been suggested heretofore to heat treat various starches for numerous reasons. For example, U.S. Pat. No. 3,527,606 discloses a method and apparatus for "dry roasting" and conducting "dry-reaction" techniques for modifying starch. The apparatus and method involve mechanical agitation of the starch particles such that they are maintained in a turbulized suspension for up to 6 hours while maintaining the temperature of the starch granules between 65.5° C. to 180° C. Thepatent does not disclose modifying the texture and taste characteristics of waxy maize starch for inclusion in particular food compositions requiring a bland-tasting starch additive.

U.S. Pat. No. 2,401,813 discloses dry heating corn starch at temperatures between 240° and 260° F. (i.e., 116° C. to 127° C.) for one to three hours to free the starch of "thermophylic bacteria." The starch to be sterilized cannot contain more than about 3% moisture. The patent does not disclose the treatment of waxy maize starch, having a high amylopectin content and a moisture content of from about 8 to about 12%.

Although the texture and flavor characteristics of other starches, such as corn, wheat, rice and sago, may be modified by heat treatment, the products resulting from the heat treatment of these starches give inconsistent and non-reproducible results in food compositions. For reasons not yet understood, only the pregelatinized, heat-treated waxy maize starch prepared according to the method described herein, produces a product capable of being substituted for conventional, chemically-modified tapioca starch in appropriate food compositions with no fall-off texture, quality or taste.

The heat treatment of this invention can be employed as a separate step or as an integral part of normal starch manufacturing.

The method of this invention does not require special equipment or unique manipulative techniques. It is only necessary to expose the commercial, granular, waxy maize starch which normally has a moisture content of from about 8 to 12%, to the desired temperature for the predetermined length of time sufficient for alteration of the texture and taste characteristics. Generally, the starch granules can be spread on a suitable support material, e.g., a flat tray, flexible moving belt or the like, and placed in an oven for heating to the desired temperature.

Generally, a source of dry heat used to maintain temperatures in the range of between 120° C. and about 200° C. may be utilized for the heat treatment. It is generally preferred to utilize temperatures in the range of from about 160° C. to about 190° C. The most preferable temperature range, however, is between about 170° C. and about 190° C. Optimum results are produced when employing a temperature of about 180° C.

The time of heat treatment will depend upon the temperature employed. Generally, lower temperatures require longer heat-treating times. Whereas, more elevated temperatures require shorter times. For example, at temperatures of about 125° C., acceptable products are obtained where the time of treatment ranges up to about 24 hours. However, at lower temperatures the texture and flavor results are somewhat inconsistent. Therefore, it is desirable to employ more elevated temperatures. At the generally preferred temperature range of 170° C. to about 190° C., and at times from about 0.10 hour up to less than 3 hours of treatment, acceptable non-woody flavors are obtained in the pregelatinized product. At the most preferred temperature range of about 170° C. to about 190° C., consistently acceptable products are obtained where the time of heat treatment is less than about 1 hour. At the optimum heat-treating temperature of 180° C., 15 to 20 minutes of heat-treating time consistently produced improved texture and an acceptable non-woody flavor in the subsequently pregelatinized starch. It should be noted that dextrinization conditions are also avoided at these temperatures by the use of the relatively short heating times.

After heat treating the waxy maize starch according to the process described above, it is pregelatinized according to known techniques, such as drum drying. The resulting product is a white, bland-tasting powder which readily rehydrates to form a thickened paste or mass. In the dehydrated form, however, the heat-treated, pregelatinized waxy maize starch granules can be incorporated by mixing in soups, sauces, puddings and other similar food compositions.

In FIG. I, a plot of temperature versus time of heat treatment, the shaded area defines the conditions where acceptable non-woody flavors are obtained in a modified waxy maize starch which is subsequently pregelatinized.

The following non-limiting examples are illustrative of the invention:

EXAMPLE 1

Heat Treatment of Waxy Maize

Waxy maize starch samples (about 900 grams each) are spread on a 26.7 cm × 38.1 cm × 1.9 cm aluminum tray which is placed in a preheated oven for the times and at the temperatures specified in Table I below.

Following heat treatment, the trays are removed and each heat-treated sample is analyzed for texture using a Brabender Amylograph. For this evaluation, sufficient starch from each sample is mixed with 500 grams of water to yield a concentration of 6%, by weight, of starch. The heat-treated waxy maize and water are first slurried in a beaker and then poured into the cooking receptacle, i.e., amylograph. The samples are heated from 30° C. to 95° C. (1.5 °/min) and held at 95° C. for 15 minutes.

The resulting cooked paste is then poured into an 8 ounce plastic cup, covered with a plastic wrap and placed in a refrigerator overnight (~6° C.). The cooled paste is then evaluated using a Boucher Electronic Jelly Tester (2.5 cm plunger) and a Brookfield Viscometer (HAT model, 3.7 cm T-Bar Wire, speed 5, 0–100 scale). The gel strength in Boucher Units has a value of zero for all of the starch samples evaluated before and after heat treatment. Viscosity evaluations are reported in Table I below. Viscosity comparisons are made using waxy maize starch, having no heat treatment, as a control. A viscosity measurement of 5 or less indicates that a substantial amount of dextrinization has occurred. Dextrinization has a deleterious effect on the ability of the starch to form a suitably viscous paste.

The data in Table I demonstrate that controlled heat treatment of the waxy maize starch granules can be used to avoid dextrinization. Heating for several hours (>6) at temperatures above 125° C. would not be recommended.

TABLE I

HEAT TREATMENT OF WAXY MAIZE STARCH AT VARIOUS TEMPERATURES PASTING EVALUATION

| TEMPERATURE | Heating Time (Hrs.) | Viscosity |
|---|---|---|
| Control: Waxy maize with no heat treatment | | 11 |
| 100° C. | 1 | 12 |
| | 3 | 13 |
| | 6 | 12 |
| 125° C. | 24 | 11 |
| | 1 | 11 |
| | 3 | 20 |
| | 6 | 10 |
| 140° C. | 24 | 5 |
| | 1 | 14 |
| | 3 | 10 |
| | 6 | 10 |
| 160° C. | 24 | 4 |
| | 1 | 10 |
| | 2 | 12 |
| | 3 | 7 |
| | 6 | 4 |
| 180° C. | 0.25 | 14 |
| | 0.50 | 15 |
| | 0.75 | 12 |
| | 1 | 4 |
| | 3 | 2 |
| | 6 | 2 |
| 200° C. | 0.25 | 13 |
| | 0.50 | 12 |

EXAMPLE 2

Pregelatinization of Heat-Treated Waxy Maize

The heat-treated, waxy maize starch samples of Example 1 are used to prepare aqueous slurries having 30% solids and drum dried on pinched drums, 80 pounds per square inch of steam pressure at about 4 revolutions per minute drum rotation. The drum-dried samples are then ground through a 0.01 Herringbone screen in a Mikro Sampl Mill (registered trademark of Pulverizing Machinery, a division of United States Filter Corporation, Summit, NJ, and then passed through a 200 mesh screen. The resulting pregelatinized, heat-treated waxy maize starch can be incorporated by mixing in soups, sauces, puddings and other similar food compositions.

Below are illustrations of the utility of this invention in a pudding mix. Vanilla-flavored pudding was chosen because it is a particularly sensitive medium for judging the presence of woody off-flavors.

EXAMPLE 3

Heat-Treated, Pregelatinized Waxy Maize Starch in a Pudding Mix

Sixteen (16) grams of each of the waxy maize starch samples from Example 2 are added to one package equivalents of Vanilla Jell-O (registered trademark of General Foods Corporation) Instant Pudding base mix.

The starch and pudding mix are prepared according to the directions on the pudding mix package and refrigerated (~6° C.) for 0.5 hours. As controls, similar pudding preparations are made using chemically-modified tapioca drum dried starch and waxy maize starch with no heat treatment instead of the heat-treated waxy maize starch of this invention. After refrigeration for 0.5 hour, the puddings were evaluated using the Boucher Jelly Tester and Brookfield Viscometer described in Example 1. Flavor and mouth texture were evaluated by laboratory personnel. The gel strength, viscosity and flavor evaluations are reported in Table II. Each pudding sample contains a starch load weight of 16 grams per package of pudding mix.

TABLE II

PROPERTIES OF HEAT-TREATED, DRUM-DRIED WAXY MAIZE STARCH IN VANILLA-FLAVORED INSTANT PUDDING BASE MIX

| TEMPERATURE | Heating Time Hrs. | Gel Strength in Boucher Units | Viscosity | Flavor |
|---|---|---|---|---|
| Control: Chemically-modified tapioca | | 85 | 35 | non-woody |
| Waxy maize with no heat treatment | | 61 | 11 | Slightly woody |
| 125° C. | 1 | 79 | 26 | slightly woody |
| | 1 | 83 | 34 | slightly woody |
| | 2 | 85 | 36 | non-woody |
| | 2.5 | 87 | 39 | non-woody |
| | 3 | 68 | 24 | woody |
| | 3 | 71 | 21 | woody |
| | 3 | 83 | 38 | non-woody |
| | 3.5 | 88 | 38 | non-woody |
| | 6 | 80 | 27 | non-woody |
| | 24 | 82 | 23 | non-woody |
| 140° C. | 1 | 81 | 28 | non-woody |
| | 2 | 85 | 34 | slightly woody |
| | 2.5 | 90 | 38 | non-woody |
| | 3 | 82 | 34 | non-woody |
| | 3 | 91 | 40 | non-woody |
| | 6 | 76 | 24 | non-woody |
| | 24 | 79 | 23 | woody non-woody |
| 160° C. | 1 | 79 | 31 | slightly woody |
| | 1 | 55 | 30 | non-woody |
| | 1 | 82 | 40 | non-woody |
| | 1.5 | 82 | 37 | non-woody |
| | 2 | 74 | 29 | slightly woody |
| | 2 | 82 | 32 | non-woody |
| | 2.5 | 70 | 24 | woody |
| | 3 | 89 | 33 | non-woody |
| | 6 | 73 | 21 | non-woody |
| 170° C. | 0.25 | 78 | 21 | non-woody |
| | 0.50 | 87 | 37 | non-woody |
| | 0.75 | 82 | 35 | non-woody |
| | 1.0 | 82 | 34 | non-woody |
| | 1.0 | 81 | 28 | non-woody |
| 180° C. | 0.15 | 87 | 38 | non-woody |
| | 0.25 | 86 | 36 | non-woody |
| | 0.30 | 84 | 37 | non-woody |
| | 0.30 | 84 | 42 | non-woody |
| | 0.50 | 82 | 35 | non-woody |
| | 0.50 | 85 | 40 | non-woody |
| | 0.50 | 84 | 37 | non-woody |
| | 0.60 | 82 | 35 | non-woody |
| | 0.75 | 84 | 38 | slightly woody |
| | 1.0 | 64 | 13 | woody |
| | 3.0 | 61 | 10 | woody |
| | 6.0 | 61 | 10 | woody |
| 190° C. | 0.17 | 95 | 47 | non-woody |
| | 0.33 | 91 | 50 | non-woody |
| | 0.33 | 87 | 45 | non-woody |
| | 0.50 | 93 | 47 | slightly woody |
| 200° C. | 0.25 | 82 | 35 | non-woody |
| | 0.25 | 85 | 36 | slightly woody |
| | 0.50 | 83 | 36 | non-woody |
| | 0.50 | 84 | 35 | slightly woody |
| | 0.75 | 72 | 23 | woody |

The data in Table II demonstrate that both gel strength and viscosity increase with time to a maximum and then decrease as dextrinization occurs. The optimumm pudding characteristics (i.e., closest to the chemically-modified tapioca control) occur at shorter heat treatment times as the temperature increases. Thus, flavors closest to the tapioca control pudding are obtained at temperatures of 160°–200° C. with 180° C. being the optimum. At 180° C., 15–20 minutes is the optimum time for obtaining the best flavor characteristics. Under these conditions, pudding samples, having a quality equivalent to the tapioca control, are obtained without the necessity for chemical modification. Although the avoidance of chemical modification is one of the advantages of this invention, it is possible to effect additional textural changes in heat-treated waxy maize by conventional methods of chemical modification using propylene oxide and phosphorous oxychloride, for example. To illustrate, textures which exhibit greater heat stability may be obtained by chemically modifying the heat-treated waxy maize starch prior to pregelatinization and incorporation into a thickened food composition.

It was observed that the control pudding, containing waxy maize with no heat treatment, developed a very pronounced wood flavor on storage. This phenomenon did not occur in the samples containing heat-treated waxy maize starch.

The most significant results are obtained for waxy maize starch in the area of flavor improvement. At temperatures above 120° C. there are times of treatment that result in a clean, non-woody flavor in the pudding made from the drum-dried samples. At the lower temperature ranges, several samples are run at the same temperatures since the results tend to vary. However, at 170° C. and 190° C., the results are substantially consistent. The pudding samples prepared under optimum heat-treatment conditions remain clean and non-woody for several months in elevated temperature storage (>20° C.).

EXAMPLE 4

Heat Treatment of Pregelatinized Waxy Maize

Waxy maize starch samples (about 900 grams each), with no heat treatment, are drum dried according to the procedure described in Example 2. The resulting drum-dried (pregelatinized) starch is spread on an aluminum tray (26.7 cm × 38.1 cm × 1.9 cm) which is placed in a preheated oven for the times and at the temperature specified in Table III.

Following heat treatment, the trays are removed and 16 grams of each of the waxy maize starch samples of this example are added to one package equivalents of Vanilla Jell-O (registered trademark of General Foods Corporation) Instant PUdding base mix.

The starch of this example and pudding mix are used to prepare a pudding which is refrigerated and evaluated as described in Example 3. Evaluations of gel strength, viscosity and flavor are reported in Table III.

TABLE III

PROPERTIES OF PREGELATINIZED WAXY MAIZE STARCH WHICH IS SUBSEQUENTLY HEAT TREATED IN VANILLA-FLAVORED INSTANT PUDDING BASE MIX

| TEMPERATURE | Heating Time Hrs. | Gel Strength in Boucher Units | Viscosity | Flavor |
|---|---|---|---|---|
| Control: Chemically-modified tapioca | | 92 | 44 | non-woody |
| Waxy maize with no heat treatment | | 87 | 41 | Slightly woody |

TABLE III-continued

PROPERTIES OF PREGELATINIZED WAXY MAIZE STARCH WHICH IS SUBSEQUENTLY HEAT TREATED IN VANILLA-FLAVORED INSTANT PUDDING BASE MIX

|  |  | Gel Strength in Boucher Units | Viscosity | Flavor |
|---|---|---|---|---|
| 160° C. |  | 0.25 | 95 | 47 | woody |
|  | 0.50 | 91 | 43 | woody |
|  | 1.0 | 91 | 43 | woody |
|  | 2.0 | 87 | 35 | more woody |
|  | 3.0 | 81 | 34 | very woody |
| 170° C. | 0.25 | 92 | 47 | woody |
|  | 0.50 | 94 | 43 | woody |
|  | 0.75 | 88 | 40 | woody |
|  | 1.0 | 88 | 39 | woody |
|  | 2.0 | 85 | 35 | very woody |
| 180° C. | 0.08 | 92 | 50 | woody |
|  | 0.25 | 92 | 44 | woody |
|  | 0.50 | 95 | 47 | woody |
|  | 1.0 | 85 | 37 | very woody |

The above data demonstrate that heat treatment is totally ineffective for modifying the flavor characteristics of nonheat-treated, pregelatinized waxy maize starch. Thus, it is critical to employ the heat treatment method of the claimed invention prior to pregelatinization in the preparation of a bland-tasting starch suitable for starch-thickened food compositions.

What is claimed is:

1. A method for preparing a pregelatinized waxy maize starch having improved flavor characteristics comprising the steps of heating, prior to pregelatinization, waxy maize starch granules, said heating being at a temperature between 120° C. and 200° C. for a time between 0.10 hours and 24 hours, said time being insufficient to effect dextrinization of the heated starch but effective to prevent the formation of woody off-flavors during subsequent pregelatinization and storage of the starch granules, and thereafter, pregelatinizing the starch granules.

2. The method of claim 1 wherein said temperature is between about 160° C. and about 190° C.

3. The method of claim 1 wherein said temperature is between about 170° C. and about 190° C.

4. The method of claim 1 wherein said time and temperature of heat treatment are within the shaded area shown in FIG. I.

5. The method of claim 4 wherein said time of heat treatment is within the shaded area in FIG. I when the temperature of heat treatment is between 170° C. and 190° C.

6. The method of claim 1 wherein prior to the pregelatinizing treatment, the heat-treated starch granules are further processed to modify textural properties.

7. The method of claim 6 wherein the additional processing comprises chemical modification.

8. A pregelatinized waxy maize starch produced in accordance with any of claims 1, 6 or 7.

9. An instant pudding composition containing the pregelatinized waxy maize starch of claim 8.

10. The method of claim 1 wherein said waxy maize starch granules have a moisture content of from about 8 to 12% water.

* * * * *

UNITED STATES PATENT AND TRADEMARK OFFICE
CERTIFICATE OF CORRECTION

PATENT NO. : 4,303,451
DATED : December 1, 1981
INVENTOR(S) : William C. Seidel et al.

It is certified that error appears in the above-identified patent and that said Letters Patent are hereby corrected as shown below:

In column 1, line 18, change "in" to -- an -- .

In column 2, line 24, before "texture" insert -- in -- ; line 59, before "treatment" insert -- heat -- .

In column 3, line 50, change "deletrious" to -- deleterious -- .

In column 5, bridging lines 62 and 63, change "optimumm" to -- optimum -- .

In column 6, line 31, change "20°" to -- 60° -- .

Signed and Sealed this

Twenty-second Day of June 1982

[SEAL]

Attest:

GERALD J. MOSSINGHOFF

Attesting Officer   Commissioner of Patents and Trademarks